(No Model.)  2 Sheets—Sheet 1.

H. A. DE V. MACLEAN.
CART FOR MILITARY OR OTHER PURPOSES.

No. 599,969. Patented Mar. 1, 1898.

Witnesses
Chas. A. Smith
J. Staib

Inventor
Harry A. de Vere Maclean
per L. W. Serrell & Son
Attys.

(No Model.) 2 Sheets—Sheet 2.

H. A. DE V. MACLEAN.
CART FOR MILITARY OR OTHER PURPOSES.

No. 599,969. Patented Mar. 1, 1898.

Witnesses
Cha<sup>s</sup> H. Smith
J. Staib

Inventor
Harry A. de Vere Maclean
per L. W. Serrell & Son
Atty<sup>s</sup>

UNITED STATES PATENT OFFICE.

HARRY A. DE V. MACLEAN, OF LONDON, ENGLAND.

CART FOR MILITARY OR OTHER PURPOSES.

SPECIFICATION forming part of Letters Patent No. 599,969, dated March 1, 1898.

Application filed August 12, 1897. Serial No. 647,944. (No model.)

*To all whom it may concern:*

Be it known that I, HARRY AUBREY DE VERE MACLEAN, a subject of the Queen of Great Britain and Ireland, residing in London, England, have invented new and useful Improvements in Carts for Military or other Purposes, of which the following is a specification.

My invention relates to carts more especially suitable for military purposes, but also applicable to other uses, which are required to pass easily through narrow or restricted spaces—such as mountain-passes, defiles, gorges, nullahs, dykes, and the like; and its object is to so construct the same as to enable part thereof to be readily detached and carried away or destroyed, so as to render the other part useless when for military reasons it may be deemed necessary to abandon the cart.

My invention will be readily understood on reference to the accompanying drawings, in which—

Figure 1:
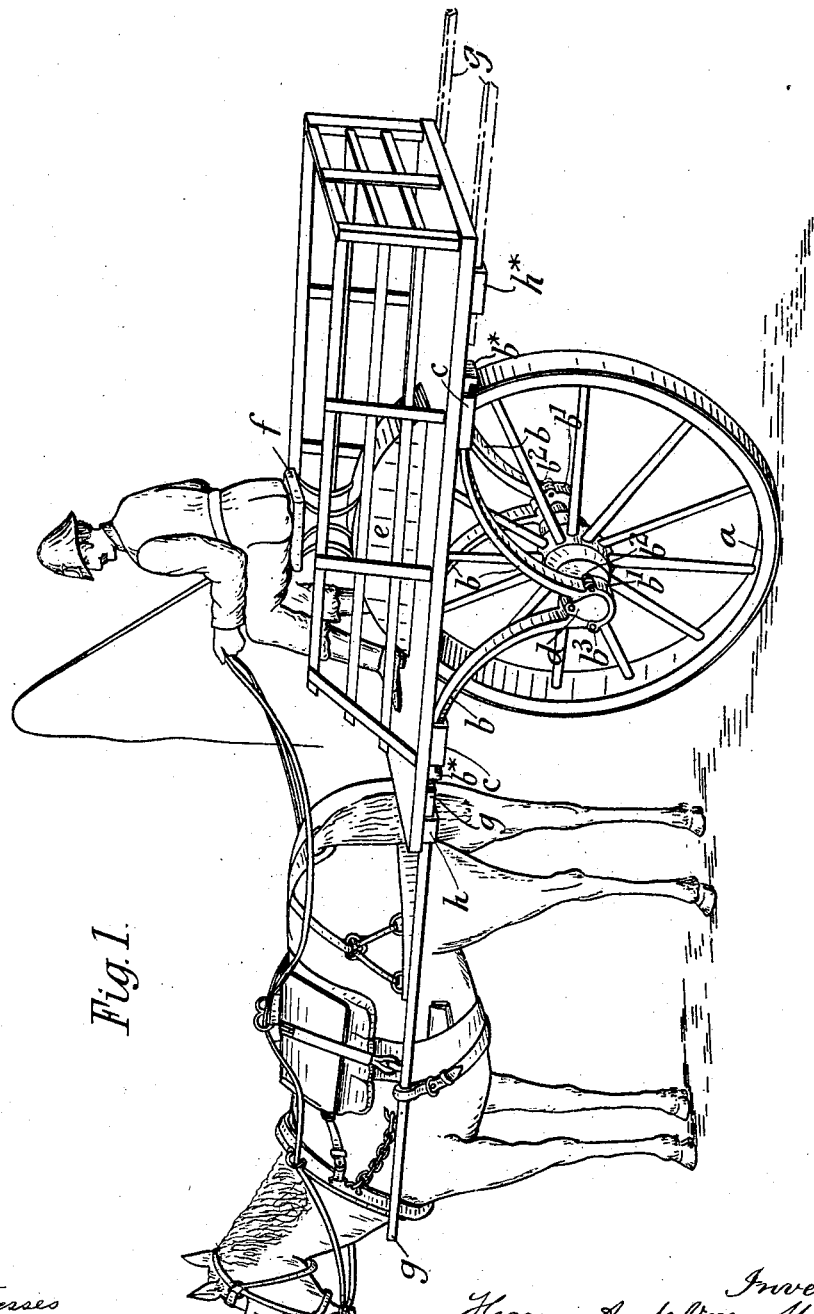
Figure 2:
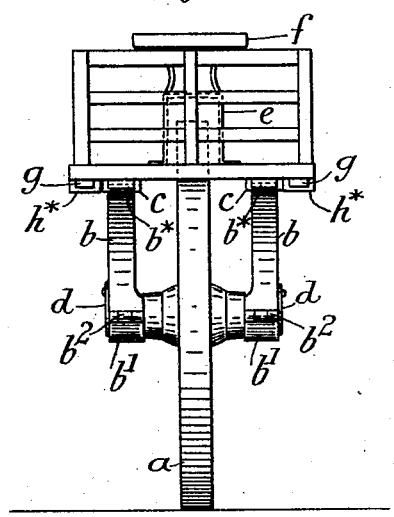
Figure 3:
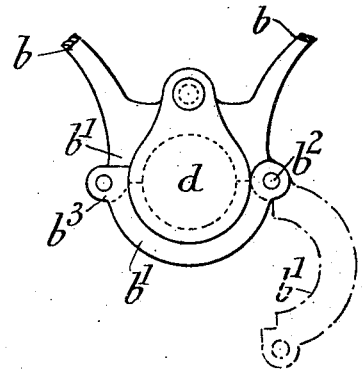
Figure 4:
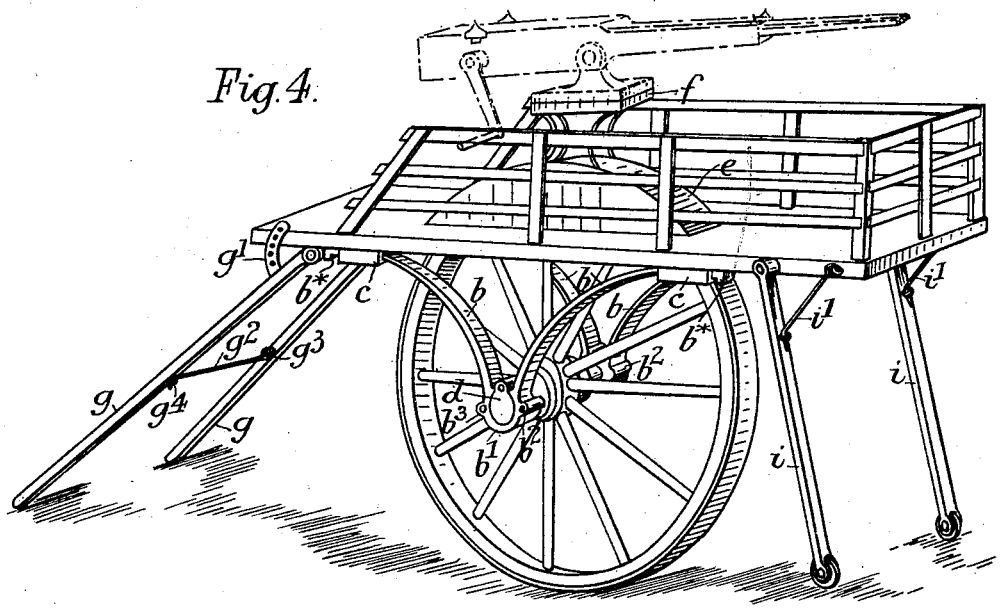

Figure 1 is a perspective view of my improved cart for military purposes. Fig. 2 is an end view of the same. Fig. 3 is a detached view showing in detail the construction of the axle-box. Fig. 4 is a perspective view of a cart similar to Fig. 1, but having a machine-gun mounted on it.

For the purpose of my invention I provide my improved cart with a single wheel $a$, which, as shown in the drawings, is arranged centrally and in the longitudinal axial line of the cart, but which can be arranged nearer to the fore end or nearer to the rear end thereof, as may be necessary, while, however, always preserving the longitudinal axial alinement. This wheel may likewise be arranged to project through the floor of the cart, as shown in the drawings, or it may be arranged below the floor. It is mounted detachably in brackets $b$, which form at the same time the bearings and springs therefor. These brackets are held in eyes or sockets $c$, secured to the under side of the floor or frame of the cart and are provided at their free ends with a projection or stop $b^*$ to allow free play thereto without fear of their becoming detached by the jolting or vibration of the cart. The lower part of these bearings forms axle-boxes $b'$, and each is provided with hinges at $b^2$ to allow them to be readily opened for the purposes of cleaning or for unmounting the axle and wheel. The end opposite the hinge is provided with an eye or lug $b^3$, adapted to fit into a similar lug (not seen in the drawings) on the upper part of the bearing or axle box, so as to enable a screw-bolt or other like contrivance to be passed through such lugs to firmly secure and maintain the parts in position. The outer side of each axle-box is advantageously provided with a pivoted cover-plate $d$ to prevent the entry of dirt or grit and to allow of the axle being readily inspected or greased.

When the cart is arranged for the wheel to project through the floor, as shown, I provide a cover $e$ to box in the wheel, and I generally mount thereon a seat $f$ for the driver.

The shafts $g$ are secured in sockets $h$, fixed to the floor or frame of the cart, and I find it advantageous to provide like sockets $h^*$ at the other end of the cart, so as to enable the shafts to be detached from one end and attached at the other, when it be desired to travel in a reverse direction, without having to turn the horse and cart around, which is sometimes impossible in narrow gorges or the like. In place of the shafts I may employ handles for manual draft.

By providing an extra pair of shafts $g$, or a couple of poles, as shown in dotted lines, to be inserted into the sockets $h^*$, the cart can readily be converted into a palanquin or a dooly.

In Fig. 4 the shafts $g$ are shown pivoted to the under side of the cart and provided with a segmental bar $g'$, having holes to receive a pin or bolt, by means of which the shafts can be secured at an angle relatively to the floor of the cart and so aid in keeping the cart in a horizontal or practically horizontal position when the horse or other animal is taken out and the cart is to serve as a gun-carriage or as an ambulance or like wagon. I also provide a stay $g^2$, hinged at $g^3$ to one of the shafts and adapted to hook into an eye $g^4$ on the other shaft, in order to steady the cart. I further mount near the rear of the cart a pair of struts $i$ to form, when required, an additional means of steadying the cart. These struts are secured by braces or stays $i'$, and when not in use can be turned on their pivots $i^2$ to lie against the sides of the cart.

When used as a gun-carriage for a field-gun, the arrangement of cart is similar to that shown in Fig. 4, but is provided with side cheeks to receive the trunnions of the gun, and owing to there being only one wheel this will form a pivot about which the cart can be turned when it is desired to train the gun. Furthermore, when the shafts are let down these will form the trail of the carriage.

When the cart is to be used as an ambulance, I prefer to provide the same with head and tail pieces, (say two pairs,) between which cots or hammocks can be slung, and said pieces are advantageously furnished with buffers or the like to reduce shock or jar which might arise from any undue longitudinal movement. Moreover, as there is but one wheel, and that in the center of the cart, greater facility is afforded to the doctor, nurse, or orderly to get close up to the patient and so attend him while on the march.

Although I have described and shown my improved cart as being specially applicable for military purposes, yet it is obvious that it can be equally well used for commercial or pleasure purposes, and as its only wheel is arranged centrally it is less liable to injury and has less strain on it than have vehicles with two or more wheels, as at present constructed.

Having now described my invention, what I claim, and desire to secure by Letters Patent, is—

1. The combination in a cart having a single central wheel, of a platform or floor, springs extending from the under side of the platform to the axle of the wheel, bearings upon the springs for such axle and hinged axle-boxes, forming the lower half of the bearings, and adapted to be opened for removing the wheel and axle, substantially as described.

2. The combination in a cart having a single central wheel, of a platform or floor, shafts and two sets of sockets, one at each end of the platform for receiving such shafts, substantially as described.

3. The combination with the cart, floor or platform, and a central wheel passing up through an opening in the platform, of springs connected at their outer ends with the under side of the platform and bearings resting upon the wheel-axle and hinged boxes for securing the axle to the springs or allowing for the removal of such axle, shafts and pivotal connections to the platform and segmental bars with holes for receiving pins to secure the shafts as braces to the platform, substantially as set forth.

In witness whereof I have hereunto signed my name in the presence of two subscribing witnesses.

HARRY A. DE V. MACLEAN.

Witnesses:
FRED C. HARRIS,
G. E. MINTERN.